United States Patent
Fohl et al.

[19]

[11] Patent Number: 6,036,340
[45] Date of Patent: Mar. 14, 2000

[54] DIMPLED MANIFOLD OPTICAL ELEMENT FOR A VEHICLE LIGHTING SYSTEM

[75] Inventors: Timothy Fohl, Carlisle, Mass.; Michael Anthony Marinelli, Northville; Jeffrey Thomas Remillard, Ypsilanti, both of Mich.

[73] Assignee: Ford Global Technologies, Inc., Dearborn, Mich.

[21] Appl. No.: 09/033,757

[22] Filed: Mar. 3, 1998

[51] Int. Cl.[7] ........................................ F21V 8/00
[52] U.S. Cl. .............................. 362/511; 362/31; 362/558
[58] Field of Search .................................. 362/511, 558, 362/554, 551, 31

[56] References Cited

U.S. PATENT DOCUMENTS

| | | | |
|---|---|---|---|
| 4,372,639 | 2/1983 | Johnson | 350/3.7 |
| 4,576,436 | 3/1986 | Daniel | 350/96.1 |
| 4,577,260 | 3/1986 | Tysoe | 362/61 |
| 4,586,781 | 5/1986 | Gunther et al. | |
| 4,642,736 | 2/1987 | Masuzawa et al. | 362/31 |
| 5,165,772 | 11/1992 | Wu | 362/26 |
| 5,323,302 | 6/1994 | Bertling et al. | 362/308 |
| 5,434,754 | 7/1995 | Li et al. | 362/31 |
| 5,570,951 | 11/1996 | Bertling et al. | 362/231 |
| 5,890,796 | 4/1999 | Marinelli. et al. | 362/511 X |

FOREIGN PATENT DOCUMENTS 2653-206  4/1991  France .

*Primary Examiner*—Stephen Husar
*Attorney, Agent, or Firm*—Leslie C. Hodges

[57] ABSTRACT

A vehicle lighting system includes a light source for generating light and a unitary optical element having a light collimating surface, a plurality of stepped surfaces projecting from the collimating surface, each stepped surface having a reflective surface angled with respect to the collimating surface for receiving collimated light, a dispersal surface angled with respect to the stepped surfaces, the dispersal surface having a plurality of dimples aligned with respect to the reflective surfaces for dispersing collimated light, and a kicker adjacent the surface having a plurality of reflective facets adapted to receive and redirect the dispersed light.

20 Claims, 3 Drawing Sheets

DIMPLED MANIFOLD OPTICAL ELEMENT FOR A VEHICLE LIGHTING SYSTEM

FIELD OF THE INVENTION

The present invention relates to an optical element for a vehicle lighting system, and more specifically, to a dimpled manifold for such optical elements.

BACKGROUND OF THE INVENTION

Conventional light transmission systems used for vehicle head lights or tail lights typically use a bulb and reflector system. In a bulb and reflector system, the filament of the bulb is placed at or near a focal point of a parabolic reflector. The light emitted by the bulb filament is collected by the reflector and reflected outward to form a light beam. A lens is used to shape the light beam into a specified pattern to satisfy vehicle lighting specifications. In a typical automotive application, a conventional bulb and reflector system collects and reflects only thirty percent of the light emitted from the bulb filament into the useful lighting area.

Bulb and reflector systems have several disadvantages, including disadvantages related to aerodynamics and aesthetic styling. For example, the depth of the reflector along its focal axis and the height of the reflector in directions perpendicular to the focal axis greatly limit attempts at streamlining vehicle contours. Additionally, thermal energy given off by the bulb during operation must be considered. The size of the reflector as well as the material used in its construction vary depending upon the amount of thermal energy generated by the bulb filament. Decreasing the size of the reflector requires use of materials with high thermal resistivity for the reflector.

One approach to develop an automotive lighting system for use with newer streamlined body designs is proposed in U.S. Pat. No. 5,434,754, assigned to the assignee of the present invention, which discloses the combination of a fiber optic light guide which transmits light from a remote light source, to an optical element having a parabolic reflector, a light manifold, and a kicker. A manifold is necessary to expand the incoming light for distribution across the kicker. One problem with such an arrangement is that the manifold takes up approximately one third of the overall foot print of the optical element. The unlit area required for the manifold is a liability when considering packaging and space limitations associated with vehicle design.

Therefore, it would be desirable to provide a laser illuminated, uniform thickness, thin sheet optic lighting system for a vehicle which accommodates manufacturing and thermal considerations as well as the limitations dictated by vehicular aerodynamic and styling requirements.

SUMMARY OF THE INVENTION

Responsive to the deficiencies in the prior art, the present invention provides a vehicle lighting system including a light source for generating light and a unitary optical element having a light collimating surface, a plurality of stepped surfaces projecting from the collimating surface, each stepped surface having a reflective surface angled with respect to the collimating surface for receiving the collimated light, a surface angled with respect to the stepped surfaces, the surface having a plurality of dimples aligned with respect to the reflective surfaces for dispersing the collimated light received therefrom, and a kicker adjacent the surface having a plurality of reflective facets adapted to receive and redirect the dispersed light through the front surface.

In a preferred embodiment of the present invention, the plurality of dimples are substantially spherical in shape.

An object of the present invention is to provide a uniform thickness, thin sheet optical element tail lamp with a reduced overall footprint.

A feature of the present invention is the utilization of a dimpled surface to disperse light. The dimpled surface accomplishes the light dispersing function of previous manifold designs while utilizing only a fraction of the size, thereby reducing the overall footprint of the tail lamp which allows for greater vehicle design flexibility.

BRIEF DESCRIPTION OF THE DRAWINGS

Other features and advantages of the present invention will become apparent to those skilled in the automotive vehicle lighting arts upon reading the following description with reference to the accompanying drawings, in which.

DETAILED DESCRIPTION OF THE PREFERRED EMBODIMENT

Figure 1:
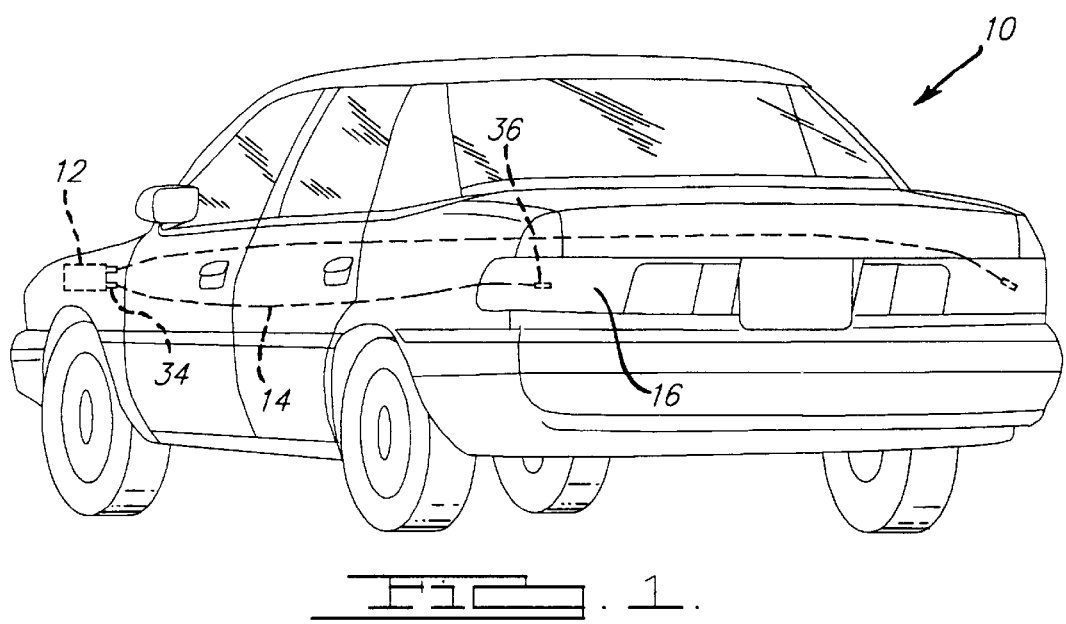
FIG. 1 is a perspective view of an automotive vehicle having a vehicle lighting system.
Figure 2:
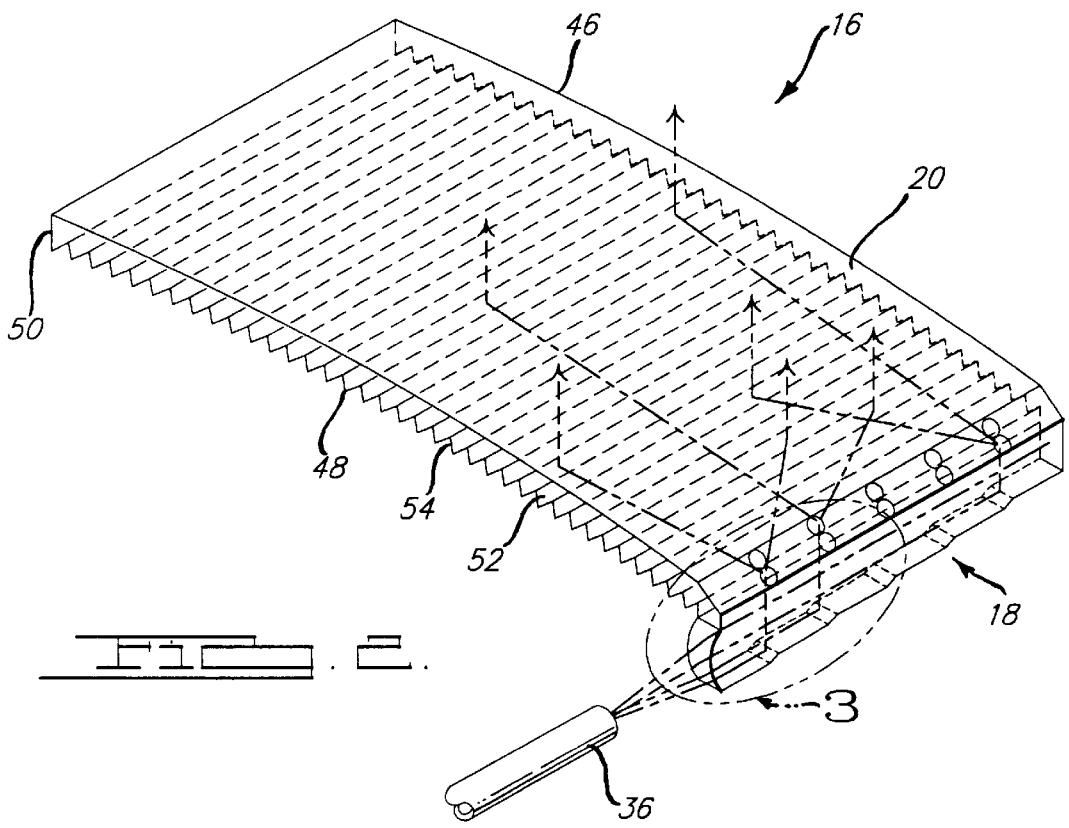
FIG. 2 is a perspective view of a vehicle lighting system optical element according to the present invention.

Turning now to the drawings, and in particular to FIGS. 1 and 2 thereof, an automotive vehicle 10 is shown having a vehicle lighting system using, in combination, a remote light source 12, a fiber optic light guide 14, and an optical element 16. The optical element 16 of the present invention is configured as a tail lamp, but may also be a head lamp or used for other vehicle lighting applications as those skilled in the vehicle lighting arts will recognize. The configuration of FIG. 1, therefore, is meant only to be illustrative and not limiting.

As shown in FIG. 1, the remote light source 12 is preferably a diode laser. The remote laser light source 12 is positioned in the automotive vehicle 10 with consideration given to vehicle design requirements and manufacturing ease relative to the particular lighting objectives. A possible location for the remote laser light source 12 is in the engine compartment (not shown). A single diode laser source is preferably used although other types of lasers as well as other types of remote light sources may be used without departing from the scope of the present invention. Alternatively, multiple laser sources or high intensity LED's may be positioned directly adjacent the optical element 16.

Preferably a fiber optic light guide 14 is utilized to transmit light from the remote laser light source 12 to the optical element 16, as shown in FIG. 1. The light guide has a first end 34 and a second end 36. Because of the high brightness (candela per unit area) of the diode laser, a small diameter (0.1–1.0 mm) light guide may be used to transmit light to each optical element 16.

The optical element 16, as depicted in FIG. 2, is preferably a uniform thickness thin sheet, but may be a tapered thickness thin sheet without departing from the scope of the present invention. The element 16 is preferably made from a transparent, solid piece of plastic such as polycarbonate and utilizes the principle of total internal reflection (TIR) to reflect light. TIR is explained in more detail below. Other transparent materials such as acrylics may also be used without departing from the scope of the present invention. The optical element 16 has a manifold 18 for expanding the laser light and a kicker 20 for transmitting light out of the optical element 16.

Figure 3:
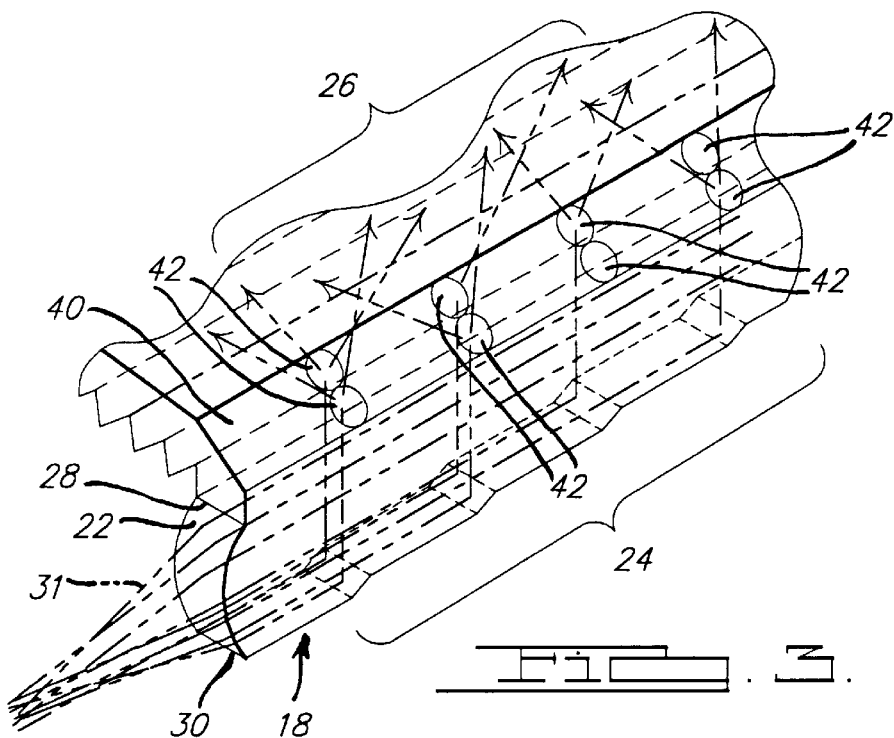
FIG. 3 is a magnified perspective view of the circled portion 3 of FIG. 2 according to the present invention.
Figure 6:
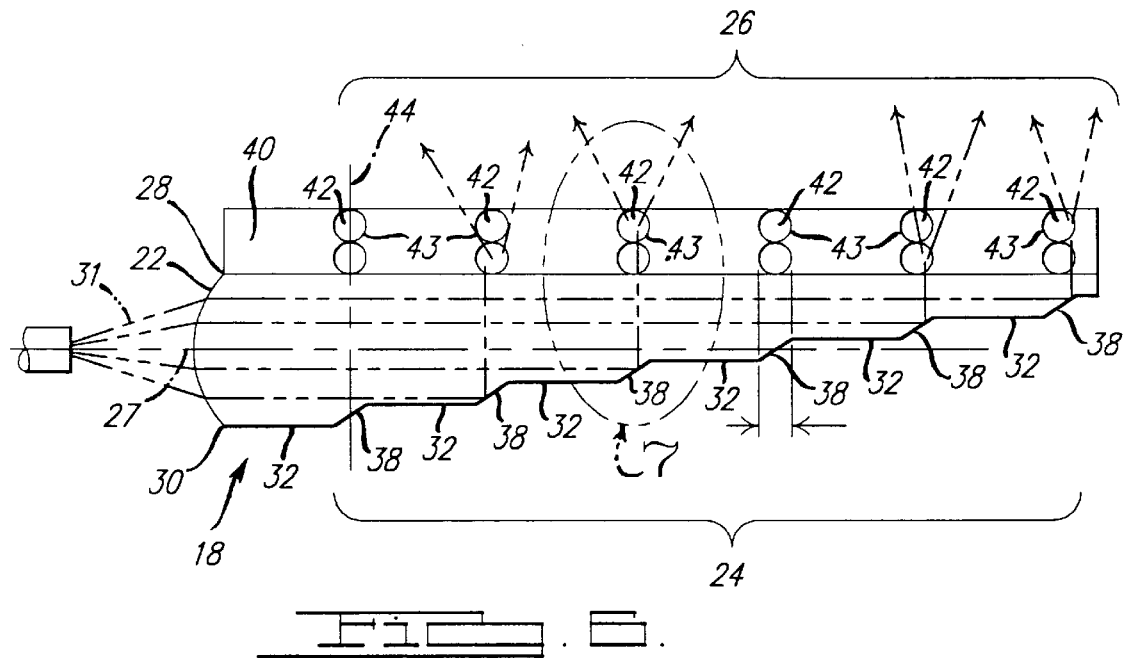
FIG. 6 is a side view of the manifold portion of the optical element according to the present invention.

As shown in FIGS. 3 and 6, the manifold 18 is an elongate structure having a collimating surface 22, a light distribution section 24, and a light dispersal portion 26. The collimating surface 22, located at one end of the manifold 18, is preferably a parabolic surface having a focal axis 27. The collimating surface 22 may also be a diffraction grating, as known in the art, or any other light collimation device without departing from the scope of the present invention. The surface 22 has an upper and lower terminal edge, 28 and 30 respectively, defining a predetermined surface height. The surface 22 is adapted to receive light rays 31, having a predetermined spread angle, over the surface height and collimate the light rays 31 parallel to the focal axis 27.

As shown in FIGS. 3–6, the light distribution section 24 is preferably a plurality of ascending steps, each step having a planar step surface 32 and a reflective surface 38. The first step projects from the lower terminal edge 30 and the cumulative height of the steps is preferably equivalent to the predetermined height of the collimating surface 22. Each planar step surface 32 is preferably parallel to the focal axis 27 and each reflective surface 38 is preferably angled with respect to the focal axis 27. A range of angles may be utilized for the reflective surface 38 depending on the particular application, but for the present invention the angle is preferably 45 degrees. The reflective surfaces 38 are adapted to receive collimated light and redirect the collimated light at a 90 degree angle, thereby directing the light perpendicular to the focal axis 27.

Figure 7:
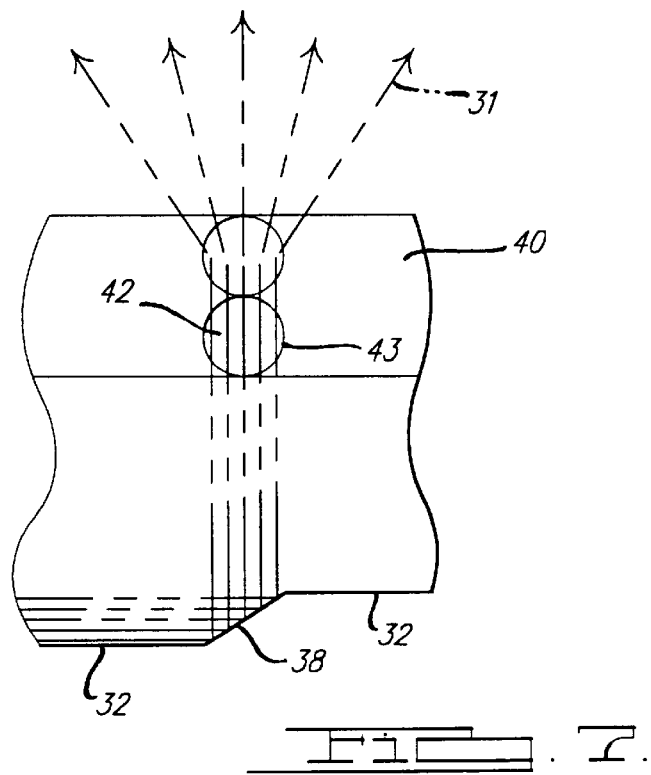
FIG. 7 is a magnified side view of the circled portion 7 of FIG. 6 according to the present invention.

As shown in FIGS. 3–6, the light dispersal portion 26 preferably has a dispersal surface 40 with a plurality of depressions or dimples 42 formed thereon. The dispersal surface 40 is angled with respect to the stepped surfaces 32. A preferred range of angles for the dispersal surface 40 is 35–45 degrees. The surface angle is chosen relative to the particular design requirements of the optical element 16, and more specifically, to an angle which would optimize illumination of the kicker 20. The dispersal portion 26 has a length substantially equivalent to the length of the cumulative stepped surfaces 32. As shown in FIG. 6, the dimples 42 disposed along the dispersal surface 40 length are positioned to correspond to a respective reflective surface 38. Specifically, the dimples 42 are positioned relative to the reflective surfaces 38 such that an axis 44, preferably perpendicular to the focal axis 27, will intersect both the dimples 42 and the reflective surfaces 38, as shown in FIGS. 6 and 7. The dimples 42, having a curvilinear dimple surface 43, are adapted to receive collimated light at varying points along the dimple surface 43. As most clearly shown in FIG. 7, the curvilinear dimple surface 43 reflects light at a unique angle for each point of intersection along the dimple surface 43. Intersection of collimated light with the dimple surface 43 in this fashion functions to disperse the light into the kicker 20. The curvilinear dimples 42 are preferably spherical in shape but may also be cylindrical or any other curvilinear shape to accomplish the light dispersal function.

Figure 4:
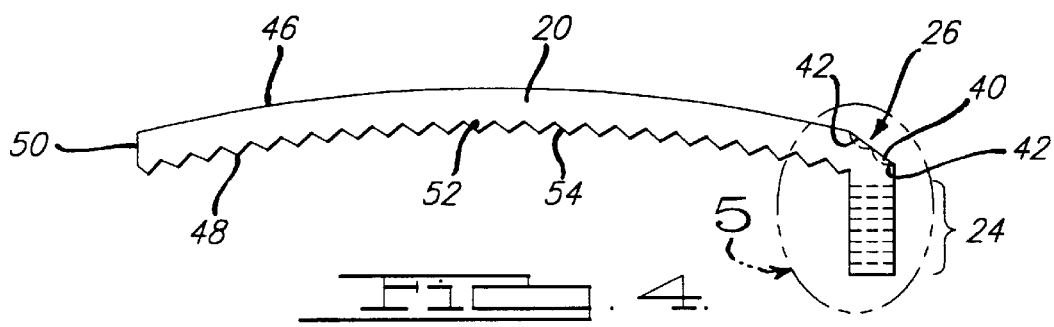
FIG. 4 is a front view of a uniform thickness thin sheet optical element according to the present invention.
Figure 5:
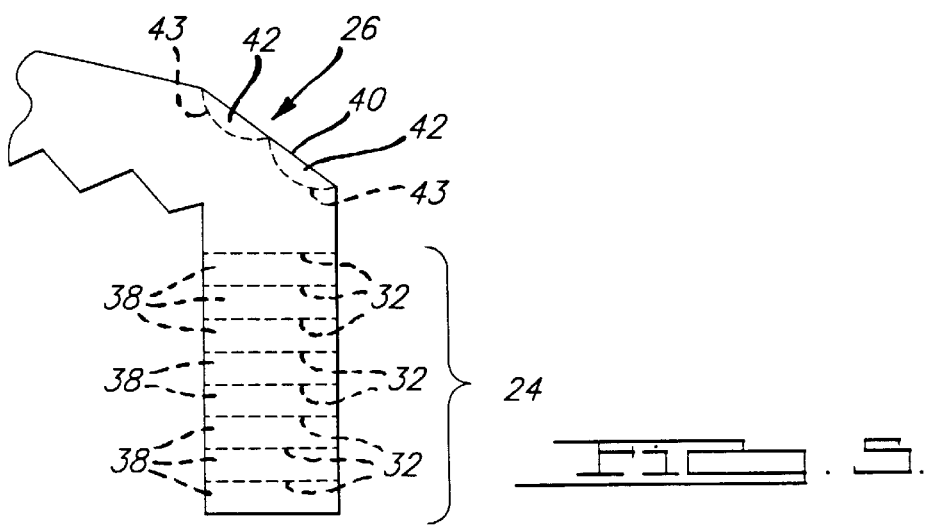
FIG. 5 is a magnified front view of the circled portion 5 of FIG. 4 according to the present invention.

The kicker 20, as depicted in FIGS. 2 and 4, has a front surface 46, a back surface 48, and a perimeter side surface 50. The front surface 46 is preferably generally parallel to the back surface 48. The perimeter side surface 50 is generally normal to both the front and back surfaces, 46 and 48 respectively, and has a predetermined side surface length. Disposed upon the back surface 48 are a plurality of micro-optical wedges 52. Micro-optical wedges 52 may also be disposed on the front surface 46 without departing from the scope of the present invention. Each micro-optical wedge 52 has a micro reflective surface 54 having a predetermined angle with respect to the front surface 46. The predetermined angle may vary with each micro-optical wedge 52 depending on the beam pattern desired. The kicker 20 preferably has a curved profile and ranges in thickness from 10 $\mu$m–6 mm. A variety of curved profiles may be used for the kicker 20 without departing from the scope of the present invention.

The first end 34 of each fiber optic light guide is connected to the remote laser light source 12 via a light coupler (not shown) such as those known in the art. The second end 36 of each fiber optic light guide is preferably situated adjacent to the collimating surface 22 of the manifold 18. The manifold 18 is preferably formed integrally with the kicker 20. A portion or the perimeter side surface 50 is adjacent the dispersal surface 40 of the manifold 18. The laser light source 12 may be placed adjacent the manifold 18 without departing from the scope of the present invention.

In use, light is emitted from the remote laser light source 12, received by the fiber optic light guide 14 via light couplers, transmitted through the fiber optic light guide bundle 14 via TIR, and emitted at the second end 36 incident upon the collimating surface 22, this combination shown in FIG. 1. As shown in FIGS. 2, 3, and 6, the collimating surface 22 collimates the light into a plurality of light rays 31 parallel to the focal axis 27. The collimated light rays 31 are transmitted toward the light distribution section 24. The reflective surfaces 38 redirect the light, perpendicular to the focal axis 27, toward the dimples 42 of the dispersal surface 40. As shown in FIG. 7, the collimated light is dispersed by the dimples 42 toward the kicker 20. As shown in FIG. 2, the light reflects at least once off the front surface 46 and is directed to the plurality of micro-optical wedges 52 of the back surface 48. The light striking the micro-optical wedges 52 is redirected via TIR out of the optical element 16 through the front surface 46.

Total internal reflection (TIR) of light occurs when an incident angle $\Pi$ of light upon a surface exceeds a critical angle $\Pi_c$ given by the equation $\Pi_c = \sin^-(n_1/n_2)$ wherein $n_1$ is the index of refraction of air and $n_2$ is the index of refraction of plastic. The plastic-air interface can be metalized if necessary to prevent the light rays from reflecting out of the plastic medium.

Only one embodiment of the vehicle lighting system of the present invention has been described. Those skilled in the automotive lighting arts will appreciate that others may be possible without departing from the scope of the following claims.

We claim:

1. A lighting system for use in an automotive vehicle, comprising:
    a light source for generating light; and
    a unitary optical element having:
        a light collimating surface adjacent the light source;
        a plurality of stepped surfaces projecting from the collimating surface, each stepped surface having a reflective surface angled with respect to the collimating surface for receiving the collimated light;

a dispersal surface angled with respect to the stepped surfaces, the dispersal surface having a plurality of dimples aligned with respect to the reflective surfaces for dispersing the collimated light received from the reflective surfaces; and a kicker having a front surface and a back surface with a plurality of reflective facets adapted to receive and redirect the dispersed light through the front surface.

2. A lighting system according to claim 1, wherein the dispersed light reflects off the front surface before being directed to the plurality of reflective facets.

3. A lighting system according to claim 1, wherein the unitary optical element is comprised of a polymeric transparent optical material.

4. A lighting system according to claim 1, wherein the kicker has a thickness between 10 µm–6 mm.

5. A lighting system according to claim 1, wherein said light source is a diode laser.

6. A lighting system according to claim 1, wherein the plurality of dimples are substantially spherical.

7. A lighting system according to claim 1, wherein the plurality of dimples are substantially cylindrical.

8. A lighting system according to claim 1, wherein the unitary optical element is an outer lens for a vehicle lamp.

9. A lighting system for use in an automotive vehicle, comprising:

a light source for generating light; and a unitary optical element having:
a curved surface, having a focal axis, adjacent the light source for collimating light;
a plurality of stepped surfaces projecting from the curved surface, each stepped surface having a reflective surface angled with respect to the focal axis for receiving the collimated light;
a dispersal surface angled with respect to the stepped surfaces having a plurality of dimples aligned with respect to the reflective surfaces for dispersing the collimated light received from the reflective surfaces; and
a kicker having a front surface and a back surface with a plurality of reflective facets adapted to receive and redirect the dispersed light through the front surface.

10. A lighting system according to claim 9, wherein the dispersed light reflects off the front surface before being directed to the plurality of reflective facets.

11. A vehicle lighting system according to claim 9, wherein the unitary optical element is comprised of a polymeric transparent optical material.

12. A vehicle lighting system according to claim 9, wherein the kicker has a thickness between 10 µm–6 mm.

13. A vehicle lighting system according to claim 9, wherein the remote light source is a diode laser.

14. A lighting system according to claim 9, wherein the plurality of dimples are substantially spherical.

15. A lighting system according to claim 9, wherein the plurality of dimples are substantially cylindrical.

16. A lighting system for use in an automotive vehicle, comprising:

a remote light source for generating light;

at least one light guide for transmitting light from the remote light source, the light guide having a first end and a second end, the first end connected to the remote light source; and a unitary optical element having:
a curved surface, having a focal axis, adjacent the second end for receiving and collimating the transmitted light;
a plurality of stepped surfaces projecting from the curved surface in ascending fashion, each stepped surface having a reflective surface angled with respect to the focal axis for receiving the collimated light;
a dispersal surface angled with respect to the stepped surfaces, the dispersal surface having a plurality of dimples aligned with respect to the reflective surfaces for dispersing the collimated light received therefrom; and
a uniform thickness kicker having a front surface and a back surface with a plurality of reflective facets adapted to receive and redirect the dispersed light through the front surface.

17. A vehicle lighting system according to claim 16, wherein the unitary optical element is comprised of a polymeric transparent optical material.

18. A vehicle lighting system according to claim 16, wherein the remote light source is a diode laser.

19. A lighting system according to claim 16, wherein the plurality of dimples are substantially spherical.

20. A lighting system according to claim 16, wherein the plurality of dimples are substantially cylindrical.

* * * * *